United States Patent

Nakamura

Patent Number: 5,774,197
Date of Patent: Jun. 30, 1998

[54] METHOD FOR DRIVING A COLOR LIQUID CRYSTAL DISPLAY

[75] Inventor: Hajime Nakamura, Kanagawa-ken, Japan

[73] Assignee: International Business Machines Corporation, Armonk, N.Y.

[21] Appl. No.: 763,988

[22] Filed: Dec. 10, 1996

[30] Foreign Application Priority Data

Feb. 19, 1996 [JP] Japan .................................. 8-030349

[51] Int. Cl.⁶ .............................. G02F 1/1335; G02F 1/13
[52] U.S. Cl. ........................................... 349/117; 349/188
[58] Field of Search ................................ 349/188, 108, 349/117

[56] References Cited

U.S. PATENT DOCUMENTS 4,422,732 12/1983 Ditzik ...................................... 350/356
5,658,505 8/1997 Shimizu et al. .......................... 364/1.34

Primary Examiner—William L. Sikes
Assistant Examiner—Tiep H. Nguyen
Attorney, Agent, or Firm—Scully, Scott, Murphy & Presser

[57] ABSTRACT

The present invention is directed to the prevention of reversal and deterioration of a screen at right and left viewing angles and upper and lower viewing angles in an OCB-mode liquid-crystal display.

It is possible to prevent deterioration of a screen by obtaining the optimum value of [absolute value $\{R(V_1)\}$ of retardation before correction by phase compensation film]/wavelength ($\lambda$) at a lower-side driving voltage for each color of R, G, and B and thereby, preventing an optical rotation of liquid crystal on B wavelength. Specifically, B wavelength is set to $R(V_1)/\lambda \leq 0.85$. By adjusting a cell gap of each color, display characteristics of a screen at right and left viewing angles are improved.

5 Claims, 7 Drawing Sheets

METHOD FOR DRIVING A COLOR LIQUID CRYSTAL DISPLAY

BACKGROUND OF THE INVENTION

1. Technical Field

The present invention relates to a method for driving a liquid-crystal display, particularly to a method for driving a liquid-crystal display using the OCB (Optically Compensated Birefringence) art for realizing a wide viewing angle and a high-speed response.

2. Prior Art

A twisted-nematic (TN) cell widely used for TFT color liquid-crystal displays (TFT/LCDs) at present has the problems that its viewing angle is small and deterioration of contrast or inversion of an image occurs when observing an LCD panel face from a diagonal direction. Therefore, it is attempted to realize a wide viewing angle by using the multidomain method for dividing each picture element on an LCD into two parts and orienting each part in a different direction or a method for dividing a picture-element electrode into a plurality of parts. Moreover, a dynamic image processing function for moving a lot of image data on the screen of a liquid-crystal display at a high speed has been required correspondingly to multimedia in recent years and improvement of the high-speed response characteristic of a liquid-crystal display cell is expected.

Figure 1:
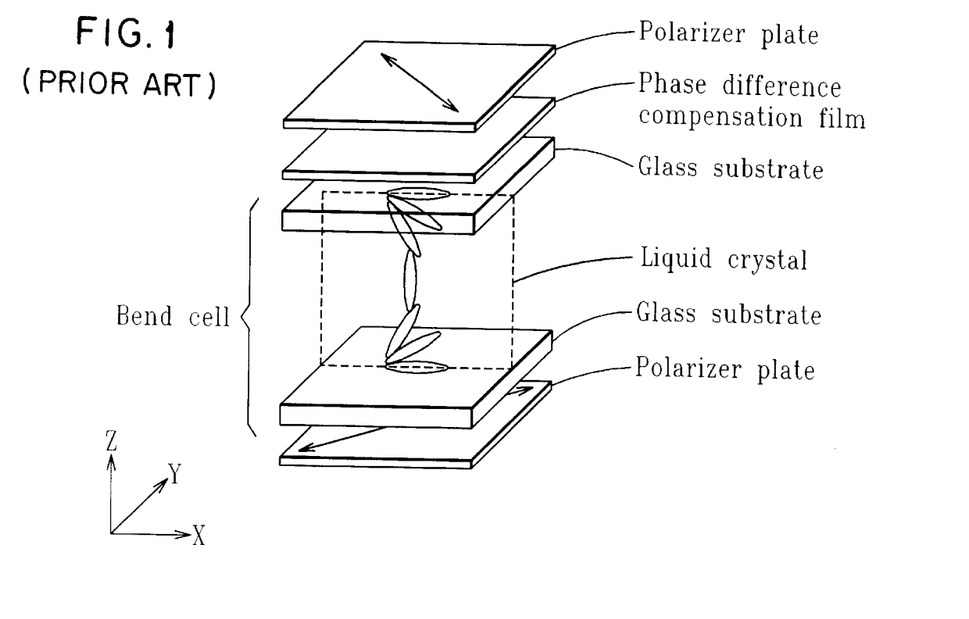
FIG. 1 shows a cell structure of OCB according to the background art.

The research of using an OCB cell instead of a TN cell as a liquid-crystal display cell has been progressed in recent years. The theory of the OCB cell is described in detail in U.S. Pat. No. 5410422 and Published Unexamined Patent Application No. 7-85254. By using the OCB cell art, it is possible to more easily obtain a wide viewing angle compared to the multidomain method and moreover, a high-speed response characteristic can be obtained in which a response speed is one-order higher than that of a conventional TN cell. FIG. 1 is a perspective view for explaining the structure of an OCB cell. A liquid-crystal material to be bend-oriented is filled between top and bottom glass substrates. A polarizing plate is provided in the areas outside of the two glass substrates respectively. A phase-difference compensation film is provided between one glass substrate and one polarizing plate. Thus, the OCB is characterized by having a structure obtained by combining a bend-orientation cell with a phase-difference compensation film.

The bend orientation represents, for example, an orientation in which liquid-crystal molecules are almost present only in XZ plane in the coordinate system in FIG. 1. In the case of this bend-orientation cell, the angle-of-visibility dependency in XZ plane shows a symmetric property because orientations of top and bottom liquid crystals are always symmetric even if applied voltages are changed. This is an advantage absent in a TN-type cell in which liquid-crystal molecules have twisted orientation. Because, in the case of the TN-type cell, liquid crystal is twisted and thereby, a phase shift defined in 3D exists, whose correction is difficult. However, the bend-orientation cell already has a symmetric property in one plane such as XZ plane, which does not require correction and it is enough to correct a phase difference in two remaining planes by a phase-difference compensation film. The phase-difference compensation film is an optically biaxial film, which cancel out the phase difference, allowing for a wide viewing angle.

However, when the number of colors displayed by liquid crystal increases to two or more, it is impossible to obtain an adequate display characteristic only from the above art. For example, problems when displaying three colors of red (R), green (G), and blue (B) are shown below.

Figure 2:
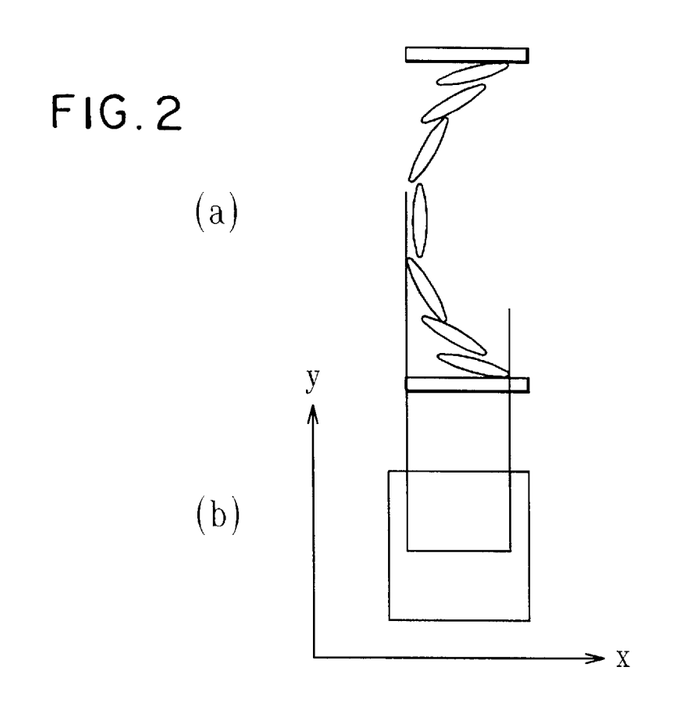
FIG. 2 is an illustration showing the theory in which an optical phase difference occurs under a bend state.
Figure 3:
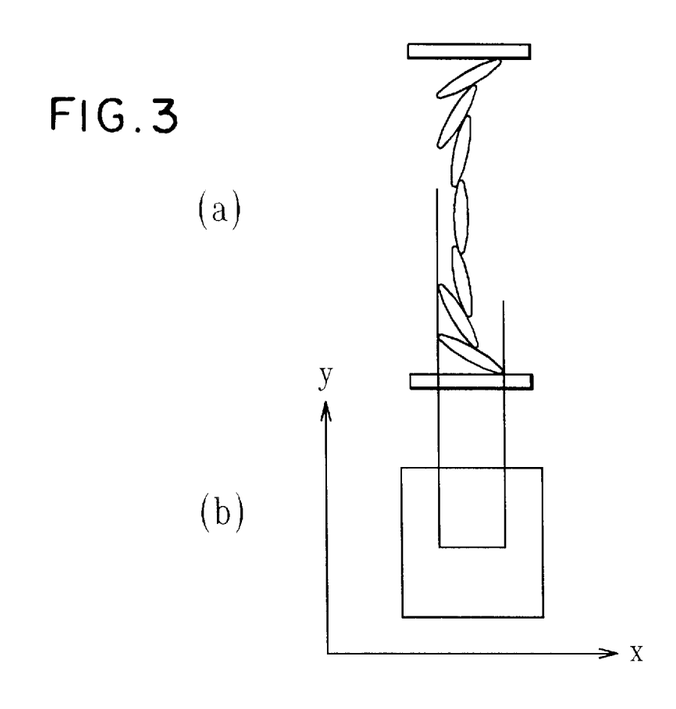
FIG. 3 is an illustration showing the theory in which an optical phase difference occurs under a bend state.

In general, an optical phase difference (retardation) under a bend state is a function of a cell applied voltage V. In this case, the optical phase difference (bias) represents a difference between an X-directional phase and a Y-directional phase produced when light passes through a liquid-crystal portion (in this case, XY plane is on the liquid-crystal panel surface). FIGS. 2 and 3 briefly show the reason why the phase difference occurs. FIG. 2a is a sectional view in the thickness direction of a liquid-crystal panel when an applied voltage is 0 or relatively low. When a cell applied voltage is 0 or low, liquid-crystal molecules have a strong bend orientation where the liquid-crystal molecules tilt up toward the middle of cell. FIG. 2b is a top view of FIG. 2a. Under the state shown in FIG. 2a, the liquid-crystal molecules are oriented in X direction nearby both electrodes as shown in FIG. 2b. FIG. 3a shows an orientation of liquid-crystal molecules when applying a relatively-high cell applied voltage. By applying a relatively-high cell applied voltage, more liquid-crystal molecules are oriented in the direction vertical to the electrode plane. Therefore, as shown in FIG. 3b, less liquid-crystal molecules are in the X-directional orientation when viewed from the top. In the bend orientation, because liquid crystals are originally oriented in XZ plane, few liquid-crystal molecules is oriented in Y direction.

The orientation of liquid-crystal molecules varies an effective refractive index of light passing through liquid crystals in the orienting direction. Because liquid crystals are oriented only in XZ plane in OCB mode, an X-directional refractive index decreases as higher voltage is applied but a Y-directional refractive index does not change. Following the above theory, applied voltage changes a relative magnitude between X- and Y-directional refractive indexes. In the case of a liquid-crystal molecule having a different orientation depending on a cell applied voltage, the X-directional refractive index differs in accordance with the degree of its X-directional orientation (see FIG. 2b and FIG. 3b). In the case of FIG. 2b (low voltage application), liquid crystals are more remarkably oriented in X direction and the refractive index in X direction which is an orienting direction increases. Therefore, the X-directional phase difference relatively increases compared to the case of FIG. 3b (high voltage application). A phase difference is approximately obtained from an expression "$\exp(2\pi i \Delta n d/\lambda)$". In this case, "I" represents an imaginary number, "$\Delta n$" represents a refractive index, "d" represents a cell gap, and "$\lambda$" represents a wavelength of light. The cell gap "d" is the same in X and Y directions and light wavelength "$\lambda$" is also constant. Therefore, the change of the refractive index $\Delta n$ directly influences a phase difference.

Figure 4:
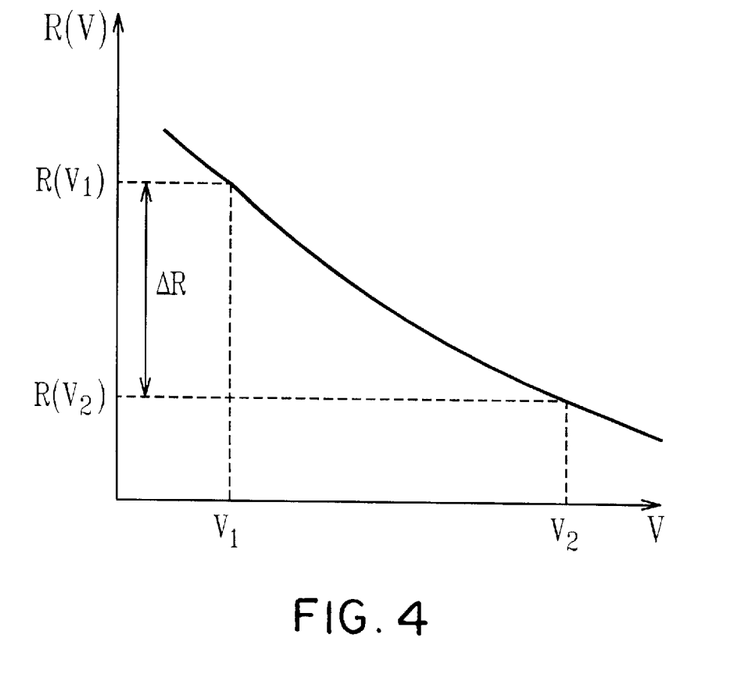
FIG. 4 is an illustration showing the relation between cell applied voltage and optical phase difference.

An optical phase difference R under a bend state is a function of cell applied voltage V, which can be expressed as R(V). FIG. 4 shows the relation between R(V) and cell applied voltage. The optical phase difference R(V) decreases as a cell applied voltage rises. This is because the orientation of liquid-crystal molecules tends to be vertical to a substrate as higher voltage is applied, thereby a refractive index is less influenced, and resultingly a phase difference is not easily produced.

Figure 5:
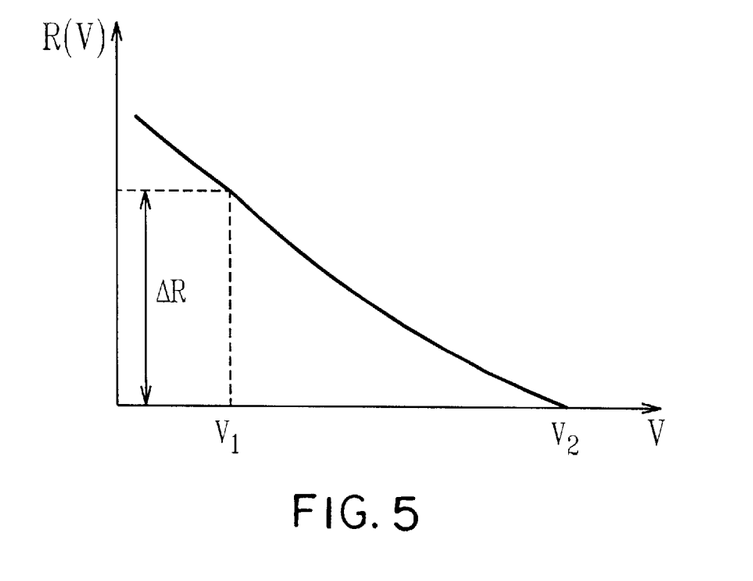
FIG. 5 is an illustration showing the corrected relation between cell applied voltage and optical phase difference.

As described above, an optical phase difference is compensated by a phase difference compensation film having an optically-biaxial characteristic. The phase difference compensation film has a function for canceling out an optical phase difference at a certain cell applied voltage. FIG. 5 shows the relation between optical phase difference and cell applied voltage when using a phase difference compensation film for compensating the optical phase difference at a cell applied voltage $V_2$. In FIG. 5, for example, the phase difference compensation film corrects the optical phase difference $R(V_2)$ at the cell applied voltage $V_2$. As a result, the curve shown in FIG. 5 decreases in optical phase difference $R(V)$ by $R(V_2)$ as a whole in accordance with the correction by the phase difference compensation film and the optical phase difference at the cell applied voltage $V_2$ is canceled. Therefore, in this case, the screen of a liquid-crystal display becomes black. It is necessary to pay attention to the fact that the difference $\Delta R$ between the optical phase differences $R(V_1)$ and $R(V_2)$ at the cell applied voltages $V_1$ and $V_2$ is constant even if compensation is performed by the phase difference compensation film.

When assuming the maximum cell applied voltage as $V_2$ and the minimum cell applied voltage as $V_1$, $\Delta R$ specifies a width from a luminance 0 to the maximum luminance. In this case, the relation between $\Delta R$ and transmittance T which is a parameter of the display characteristic of a liquid-crystal display is shown by the following expression (1).

[Equation 1]

$$T = \sin^2(\Delta R/\lambda \cdot \pi) \tag{1}$$

In general, a liquid-crystal display is designed so that transmittance T has a tunable range of 100% on a certain wavelength. This is because the screen of a liquid-crystal display completely changes from white to black when transmittance T is set to 100%. That is, according to the expression (1), it is preferable to set the relation between $\Delta R$ and $\lambda$ so that $\Delta R/\lambda$ equals 0.5.

Then, the relation between optical phase difference (hereafter referred to as retardation) R, retardation difference $\Delta R$, wavelength $\lambda$, and transmittance T is studied below by introducing the concept of cell gap d and liquid-crystal refractive index $\Delta n$. First, the retardation R is approximately inversely proportional to the cell applied voltage V. Therefore, when assuming the retardation at a certain voltage $V_1$ as $R(V_1)$, the retardation $R(V)$ at any applied voltage V can approximately be shown by the following expression (2).

[Equation 2]

$$R(V) = R(V_1)(V_1/V) \tag{2}$$

Thereby, because $R(V_2) = R(V_1)(V_1/V_2)$ is effected for $V = V_2$, the retardation difference $\Delta R = R(V_1) - R(V_2)$ is shown as the following expression.

[Equation 3]

$$\Delta R = R(V_1)(1 - V_1/V_2) \tag{3}$$

In this case, from the viewpoint of optical design, it is more convenient to express the retardation difference by using cell gap d and liquid-crystal refractive index $\Delta n$ like the following expression (4).

[Equation 4]

$$R(V_1) = k_1 \Delta nd \tag{4}$$

This is because cell gap d and liquid-crystal refractive index $\Delta n$ represent specific product design values though the retardation R represents a physical value. In the expression (4), $k_1$ represents a constant for making the relation between $R(V_1)$ and $\Delta nd$ equivalent. Though the constant $k_1$ actually depends on liquid-crystal dielectric constant, elastic constant, and applied voltage $V_1$, the constant $k_1$ is usually approx. ⅓.

Then, by substituting the expression (4) for the expression (3), the following expression (5) is obtained.

[Equation 5]

$$\Delta R = k_1 \Delta nd(1 - V_1/V_2) \tag{5}$$

When assuming $k_1 = ⅓$, $V_1 = 2V$, and $V_2 = 6V$, $\Delta R = \tfrac{2}{9}\Delta nd$ is obtained from the expression (5) or $R(V_1) = \Delta nd/3$ is obtained from the expression (4).

By introducing the above various constants and transforming the expression (1), the following expression (6) is obtained.

[Equation 6]

$$\Delta R/\lambda = (\sin^{-1}(T^{0.5}))/\pi \tag{6}$$

By determining transmittance T required as a design value in accordance with the expression (6), it is possible to understand which $\Delta R$ can be applied. As described above, because $\Delta R$ represents a physical value and it is inconvenient for design, the following operation is performed to replace $\Delta R$ with $\Delta nd$.

First, by introducing a constant $k_2 = R(V_2)/R(V_1)$, $k_2 = R(V_2)/R(V_1) = V_1/V_2$ is led because $V = V_2$ is substituted for the expression (2) and the following expression (7) is obtained from the expression (5) in relation to $k_2$.

[Equation 7]

$$\Delta R = k_1 \Delta nd(1 - V_1/V_2) = k_1 \Delta nd(1 - k_2) \tag{7}$$

Moreover, because the expression (6) also shows $\Delta R$, the following expression (8) can be obtained by equating the expression (6) with the expression (7).

[Equation 8]

$$k_1 \Delta nd(1 - V_1/V_2) = ((\sin^{-1}(T^{0.5}))/\pi)\lambda \tag{8}$$

Then, by expanding the expression (8) on $\Delta nd$, the relation between $\Delta nd$ and T is finally obtained as the following expression (9).

[Equation 9]

$$\Delta nd = (\sin^{-1}(T^{0.5}))\lambda/k_1(1 - V_1/V_2)\pi \tag{9}$$

In this case, because $k_2 = V_1/V_2$, it is possible to obtain, when setting T to a certain value, the relation between product $\Delta nd$ (obtained by multiplying a cell gap and a liquid-crystal refractive index) and wavelength $\lambda$ by substituting $k_1$, $V_1$, and $V_2$ for the expression (9).

For example, according to the above conditions, $k_1 = ⅓$, $V_1 = 2V$, and $V_2 = 6V$ are obtained. Therefore, when setting $T = 1$ or $T = 0.8$, the following values are obtained.

$$T = 1 \quad \Delta nd = 2.25\lambda$$
$$T = 0.8 \quad \Delta nd = 1.6\lambda$$

Figure 7:
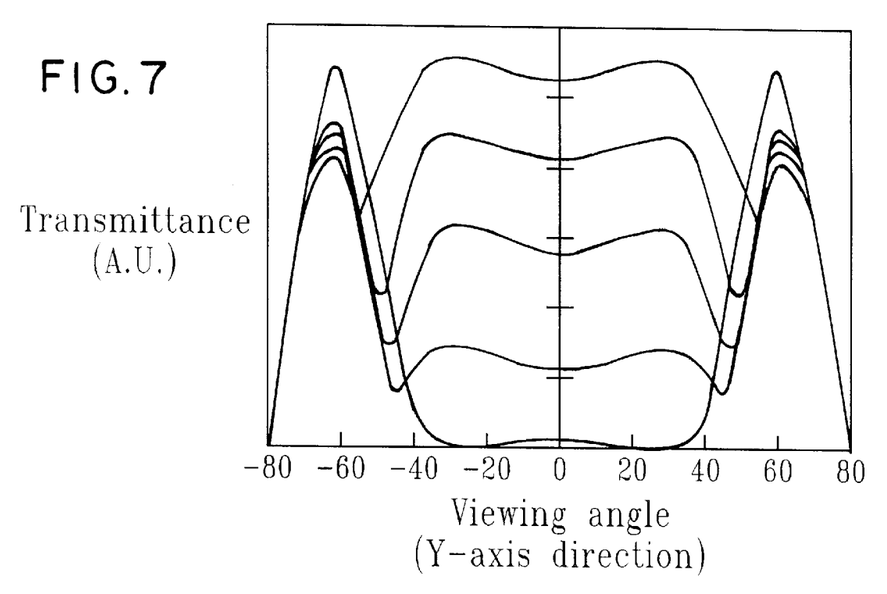
FIG. 7 shows transmittance-viewing-angle characteristics in upper and lower viewing-angle directions in the background art.

The above mentioned are matters related to general design of an OCB-mode liquid-crystal display. In the case of a conventional OCB-mode liquid-crystal display, however, reversal or coloring occurs in the top and bottom angle-of-visibility directions. The former is shown in FIG. 7. FIG. 7 is obtained by plotting transmittance on X axis and viewing angle on Y axis (when an angle is given to Y direction). From FIG. 7, it is found that luminance reversal occurs in an area of a large viewing angle. Moreover, as the result of observing coloring which is an index for showing the display characteristic, a large coloring is observed at a polar angle of 40° as shown by X and Y indications of C.I.E1931 in FIG. 8. Moreover, FIG. 9 shows an illustration, in the case of the same cell gap for each R (red), G (green) and B (blue), for wavelength dispersions of retardations of a phase difference compensation film (shown as retardar in FIG. 9) the retardation of the liquid crystal (shown as LC in FIG. 9) viewed from the front and the right and left at an angle of 80°. In FIG. 9, "normal" and "tangential" represent a case vertical to a plane and a case of the viewing angle of 80° at the right and left. As shown by broken lines, because the wavelength depending characteristic of the retardation of the phase difference compensation film is not matched with the wavelength depending characteristic of the retardation of the liquid crystal (shown by a line other than a thick continuous line), defects such as coloring and the like cannot be avoided for right and left viewing angles.

Figure 6:
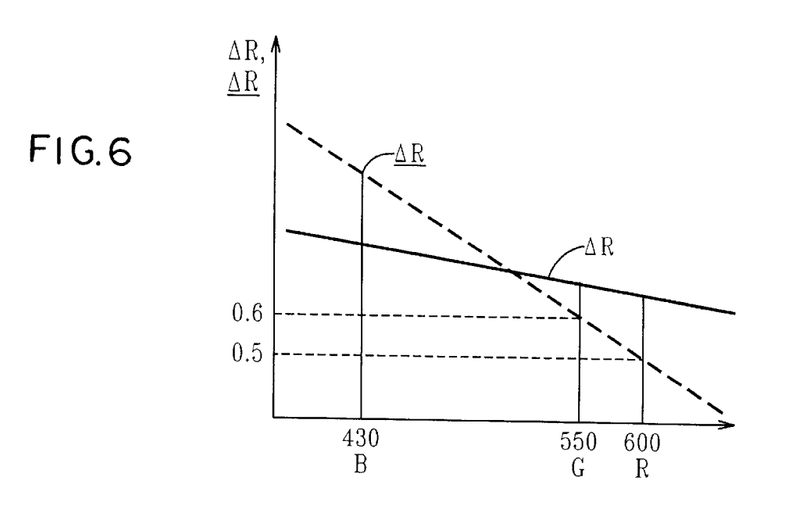
FIG. 6 is an illustration showing the relation between ΔR, ΔR/λ, and λ.

In the case of a conventional OCB-mode liquid-crystal display, the transmittance of each color is not unified. It is easy to set transmittance T to 1 (100%) which is an ideal transmittance value when a liquid-crystal display color is a single color. This is because λ is constant and thereby, it is possible to use Δnd suitable for λ (or ΔR; as shown in the expression (5), both are replaced with an equivalent relation by a constant). However, in the case of three liquid-crystal display colors of R (red), G (green) and B (blue), it is not always easy to set transmittance T to 1. This is because the wavelength dependency of ΔR/λ is very large though transmittance T is obtained as a function using ΔR/λ as a parameter from the expression (1). FIG. 6 shows general trends of ΔR and λ and each wavelength value of R (red), G (green), and B (blue). As shown in FIG. 6, because ΔR has a negative correlation to a wavelength, ΔR/λ obtained by dividing ΔR by λ which has a positive correlation to a wavelength shows an extremely negative correlation compared to the relation of ΔR to a wavelength. Therefore, if ΔR/λ of R (red) is set to 0.5 which is the optimum value, ΔR/λ of B (blue) comes to an extremely large value.

SUMMARY OF THE INVENTION

Figure 8:
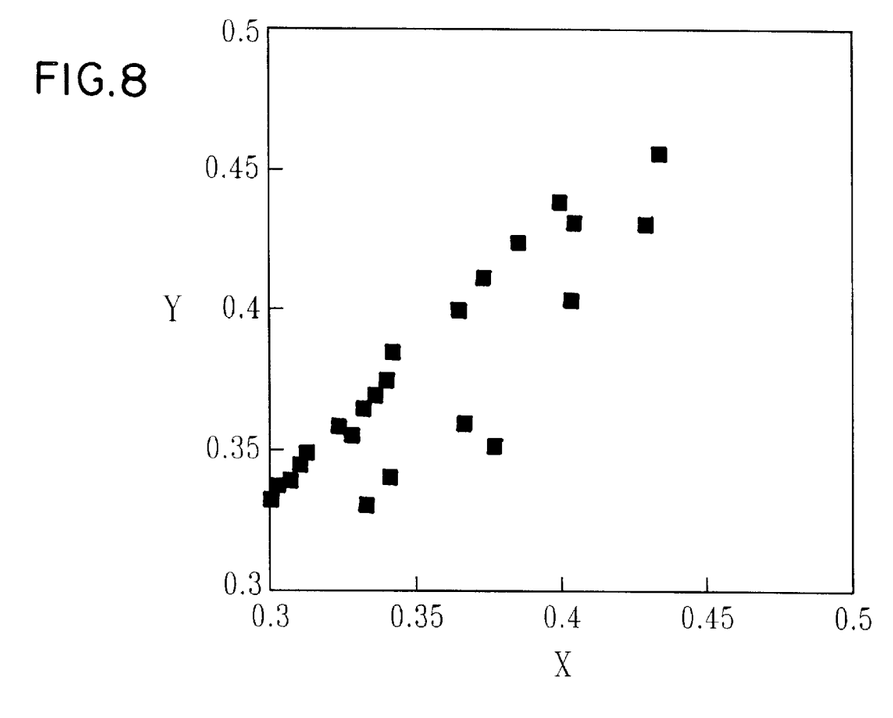
FIG. 8 shows coloring characteristics in the background art.
Figure 9:
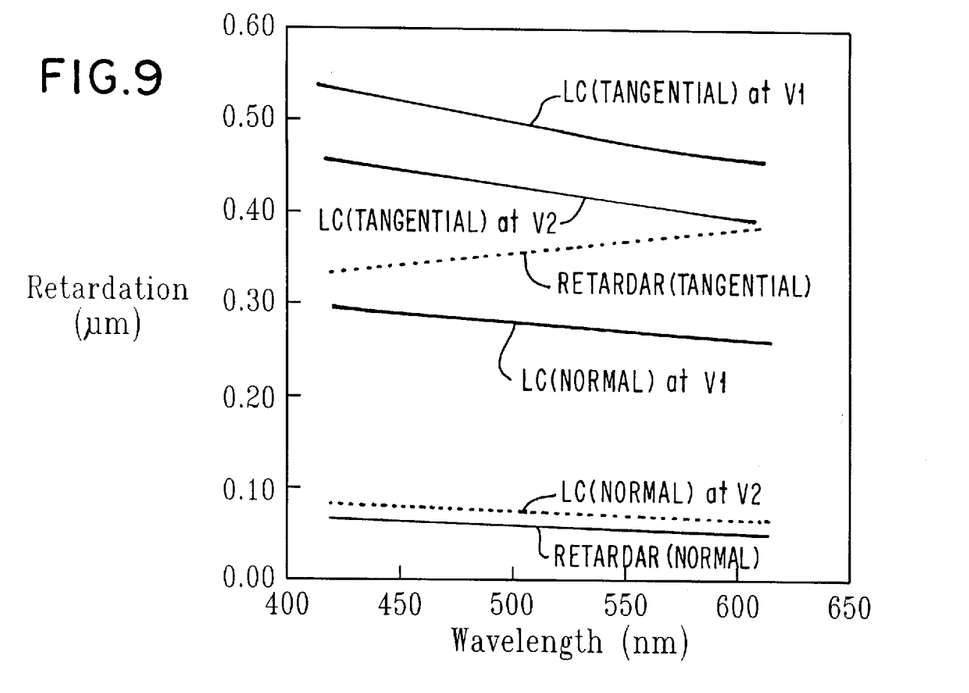
FIG. 9 shows retardation-wavelength characteristics in right and left viewing-angle directions in the background art.

It is an object of the present invention to prevent vision characteristics of the screens shown in FIGS. 7, 8, and 9 from deteriorating in an OCB-mode liquid-crystal display. To achieve the above object, it is an object of the subject invention to provide the optimum value of $R(V_1)$.

Moreover, the subject invention provides an OCB-mode liquid-crystal display design method for making transmittance constant for each color while achieving the above objects.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 10:
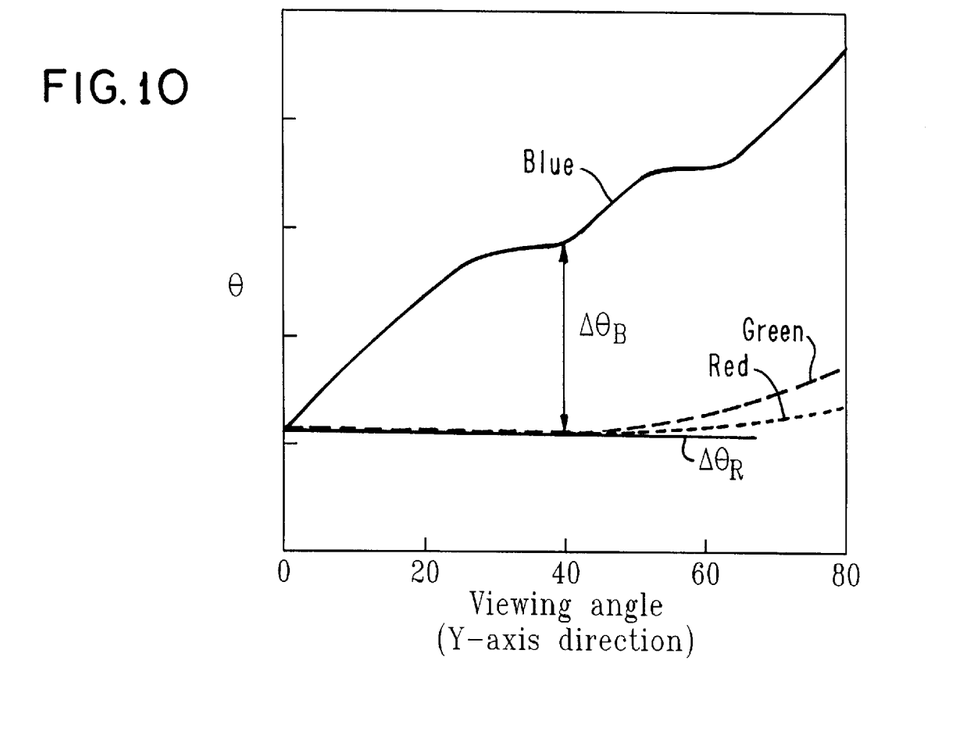
FIG. 10 shows optical rotation/2π-viewing-angle characteristics of an elliptic principal axis in the background art.

The subject invention prevents the optical rotation of liquid crystal on B (blue) wavelength by obtaining the optimum value of $R(V_1)$ on each of R (red), G (green), and B (blue). As described above, $R(V_1)$ is the absolute value of the retardation before corrected by a phase compensation film at a low-side driving voltage $V_1$ (see FIG. 4). This means is adopted on the basis of the following discovery by the inventor. FIG. 10 shows a graph in which a variable (hereafter referred to as θ) obtained by dividing the angle of an elliptic principal axis immediately after ejecting a phase difference film by 2π is assigned to Y axis and viewing angles (when an angle is given to Y-axis direction) are plotted on X axis. As shown in this graph, deterioration of a screen is observed because the optical rotation on B (blue) wavelength is extremely larger than the optical rotations on R (red) and G (green) wavelengths. The optical rotation represents a difference between the angle of the principal axis of elliptical polarization of incoming light and that of the principal axis of elliptical polarization of outgoing light, which is shown by symbol Δθ in FIG. 10. For example, in the case of a viewing angle of 40°, optical rotation $\Delta\theta_R$ on R (red) is very small but optical rotation $\Delta\theta_B$ on B (blue) is very large. The inventor specified that the fluctuation of the optical rotation for each color causes reversal and coloring of a screen. Therefore, it is estimated that decrease of the fluctuation of the optical rotation for each color, that is, making $\Delta\theta_R$ close to $\Delta\theta_B$ improves the quality of a screen.

Then, it was found that the optical rotation of liquid crystal on B (blue) wavelength can be prevented from occurring by optimizing the value of $R(V_1)/\lambda$. The subject invention applies the discovery to design of a liquid-crystal display. The inventor invented that the optical rotation on B (blue) wavelength can be prevented for $R(V_1)/\lambda \leq 0.85$ on B (blue) wavelength. Though details of this theory are not clarified, it is estimated that the above mentioned is caused by the fact that only B (blue) wavelength among three color rays used for a color liquid-crystal display is relatively separate from R (red) and G (green) wavelengths. This is because it is estimated that an optical function of an optical linear device depends on a ratio between light wavelength λ and spatial distance (in this case, cell gap) and therefore, any unique phenomenon occurs in B (blue) wavelength particularly separate from other wavelengths.

Table 1 shows a case in which the problem of screen deterioration is improved by restraining the optical rotation on B (blue) wavelength in accordance with a condition of $R(V_1)/\lambda < 0.85$ on B (blue) wavelength. In this case, R (red) has a wavelength of 610 nm, G (green) has a wavelength of 550 nm, and B (blue) has a wavelength of 430 nm.

TABLE 1

| | R(V$_1$)/λ | | | Fluctuation of optical | Top and bottom viewing-angle |
|---|---|---|---|---|---|
| | R | G | B | rotation | characteristics |
| Embodiment 1 | 0.32 | 0.37 | 0.56 | Absent | Absence of reversal |
| Embodiment 2 | 0.26 | 0.30 | 0.42 | Absent | Absence of reversal |
| Embodiment 3 | 0.29 | 0.33 | 0.47 | Absent | Absence of reversal |
| Embodiment 4 | 0.51 | 0.59 | 0.82 | Absent | Absence of reversal |
| Embodiment 5 | 0.38 | 0.44 | 0.68 | Absent | Absence of reversal |
| Embodiment 6 | 0.55 | 0.64 | 0.88 | Absent | Absence of reversal |
| Comparative exemple 1 | 0.58 | 0.67 | 0.93 | Present | Presence of reversal |
| Comparative example 2 | 0.62 | 0.70 | 1.02 | Present | Presence of reversal |
| Comparative example 3 | 0.22 | 0.27 | 0.39 | Absent | Presence of reversal |

For B (blue) wavelength, it is preferable to set R(V$_1$)/λ to 0.8 or less. The upper limit of R(V$_1$)/λ is approx. 0.85. When increasing the value of R(V$_1$)/λ, problems on optical rotation occur (comparative examples 1 and 2). When decreasing R(V$_1$)/λ for B (blue) wavelength (for example, smaller than 0.4), no optical rotation occurs but the contrast lowers and no sufficient transmittance is obtained. Therefore, the problem occurs that the current efficiency for display is lowered. Therefore, it is estimated that the range of R(V$_1$)/λ capable of executing the subject invention lies between 0.4 and 0.85 (both included).

As shown in the expression (9), the following expression (10) is effected at a certain transmittance T.

[Equation 10]

$$\Delta nd = K\lambda \quad (10)$$

{In this case, K represents a constant obtained by transforming the expression (9).} However, liquid-crystal refractive index Δn is not constant for each color. In the case of normal liquid crystal, refractive index Δn has dependency of wavelength λ and shows a negative correlation that the refractive index increases as the wavelength decreases. Therefore, if there is the above described relation of Δnd=Kλ (K is an optional constant) between these physical values, it is difficult to directly apply K$_1$ obtained by optimizing the transmittance on a certain wavelength λ$_1$ (e.g., B (blue) wavelength) to other wavelength λ$_2$ (e.g., R (red) wavelength). This is because Δn has a negative correlation and thereby the relation of K$_1$<<K$_2$ is obtained K$_1$=(Δn$_1$)d/λ$_1$ at B (blue) wavelength λ$_1$ and K$_2$=(Δn$_2$)d/λ$_2$ at R (red) wavelength λ$_2$ by transforming the expression (10) about K.

Therefore, the second embodiment of the subject invention keeps the above described K constant or in a certain range by individualizing, for example, cell gap d which can be designed and adjusted by changing the thickness of a color filter for each wavelength. As a result, it is possible to optimize a cell by keeping transmittance T constant or in a certain range for each color. In the case of the second embodiment described below, cell gap d is optimized for each color in order to compensate the decrease of the transmittance.

FIG. 6 shows the wavelength dependency of ΔR/λ having an equivalent correlation with Δnd. In the following discussion, ΔR/λ is described as a parameter because design is not a problem but a physical value is a problem. Value ΔR/λ tends to extremely decrease as a wavelength increases. This is because a wavelength serving as a denominator increases though ΔR has a negative correlation to a wavelength.

Cell gap d and ΔR have a simple linear relation. Therefore, when assuming ΔR=ΔR$_0$ at a certain cell gap d$_0$, ΔR=(d/d$_0$)ΔR$_0$ is effected at an optional cell gap d.

When setting a necessary transmittance to T in the expression (1), the following expression (11) is obtained.

[Equation 11]

$$\Delta R/\lambda = \sin^{-1}(T^{0.5})/\pi \quad (11)$$

By substituting the above relation for the expression (11), cell gap d is obtained from the following expression (12).

[Equation 12]

$$d = (\sin^{-1}(T^{0.5})/\pi)(\lambda/\Delta R_0)d_0 \quad (12)$$

Table 2 shows specific cell gaps d$_R$, d$_G$, and d$_B$ of colors R (red), G (green), and B (blue) obtained from the above relation. In Table 2, d equals 5 μm and ΔR/λ shows 0.32, 0.37, and 0.50 for R (red), G (green), and B (blue) respectively.

TABLE 2

| | Transmittance | Cell gap (μm) | | |
|---|---|---|---|---|
| | (%) | d$_R$ | d$_G$ | d$_B$ |
| Embodiment 1 | 80 | 5.5 | 4.9 | 3.5 |
| Embodiment 2 | 90 | 6.2 | 5.4 | 4.0 |
| Embodiment 3 | 100 | 7.7 | 6.6 | 5.0 |
| Embodiment 4 | 70–80 | 4.9 | 4.5 | 3.5 |
| Embbdiment 5 | 80–90 | 5.5 | 5.0 | 4.0 |
| Embodiment 6 | 90–100 | 6.2 | 5.8 | 4.9 |
| Embodiment 7 | 70–90 | 5.0 | 5.0 | 4.0 |

Embodiment 1 shows a case in which the transmittance is set to approx. 80% for every wavelength, Embodiment 2 shows a case in which the transmittance is set to approx. 90% for every wavelength, and embodiment 3 shows a case in which the transmittance is set to 100% for every wavelength. Moreover, it is possible to keep the transmittance for each wavelength in a range without strictly unifying it as shown in embodiments 4 to 7. In the case of embodiment 7, for example, transmittances on B (blue) wavelength, G (green) wavelength, and R (red) wavelength are set to 90%, 84%, and 71% respectively. All the embodiments are provided with R(V$_1$)/λ≦0.85 which is a condition specifying that no optical rotation occurs in B (blue) wavelength. Table 3 shows values of ΔR/λ on each embodiment in Table 2.

TABLE 3

| | Transmittance | ΔR/λ | | | Display |
|---|---|---|---|---|---|
| | (%) | R | G | B | characterisitic |
| Embodiment 1 | 80 | 0.35 | 0.36 | 0.35 | Good |
| Embodiment 2 | 90 | 0.40 | 0.40 | 0.40 | Good |
| Embodiment 3 | 100 | 0.50 | 0.50 | 0.50 | Good |
| Embodiment 4 | 70–60 | 0.31 | 0.33 | 0.35 | Good |
| Embodiment 5 | 80–90 | 0.35 | 0.37 | 0.40 | Good |
| Embodiment 6 | 90–100 | 0.40 | 0.43 | 0.50 | Good |
| Embodiment 7 | 70–90 | 0.32 | 0.37 | 0.40 | Good |
| Comparative example 1 | 60–90 | 0.25 | 0.35 | 0.57 | Coloring |

TABLE 3-continued

| | Transmittance (%) | ΔR/λ R | ΔR/λ G | ΔR/λ B | Display characterisitic |
|---|---|---|---|---|---|
| Comparative example 2 | 50–80 | 0.20 | 0.30 | 0.50 | Coloring |

As shown in Table 3, it is preferable that ΔR/λ is kept within ±5% for every wavelength. Unless ΔR/λ is kept within ±5%, the problem such as coloring at right and left viewing angles shown in FIG. 9 may occur.

Table 4 shows various constants obtained by actually experimentally manufacturing embodiment 1 in Table 1.

TABLE 4

| | R | G | B |
|---|---|---|---|
| Wavelength (μm) | 0.61 | 0.55 | 0.41 |
| Δn | 0.1594 | 0.1660 | 0.1922 |
| d (μm) | 4.0 | 4.0 | 4.0 |
| R (V$_1$) (μm) | 0.2026 | 0.2106 | 0.2418 |
| R (V$_1$)/λ | 0.33 | 0.38 | 0.56 |
| ΔR/λ | 0.26 | 0.30 | 0.4 |
| T (%) | 53 | 65 | 90 |

Figure 11:
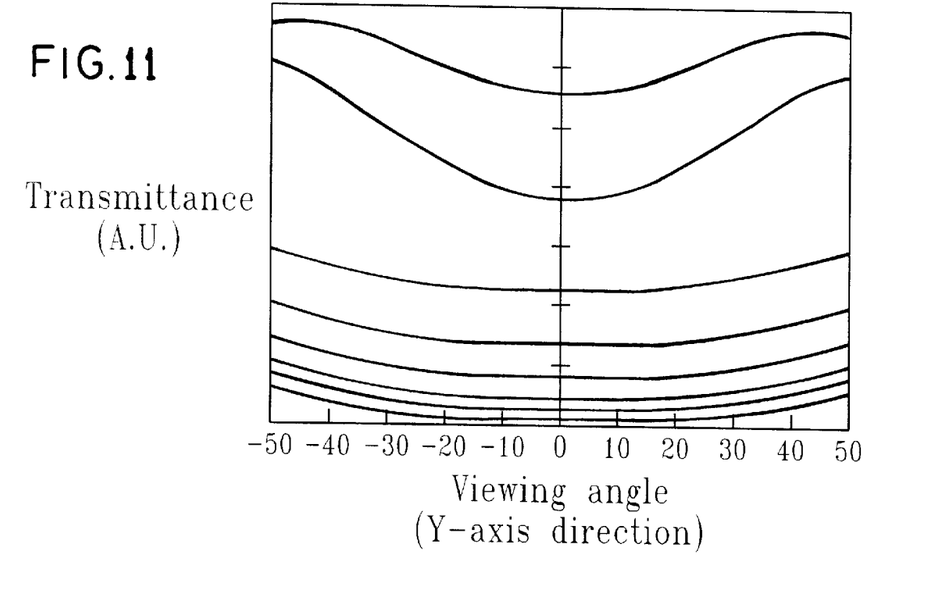
FIG. 11 shows luminance-viewing-angle characteristics in the subject invention.
Figure 12:
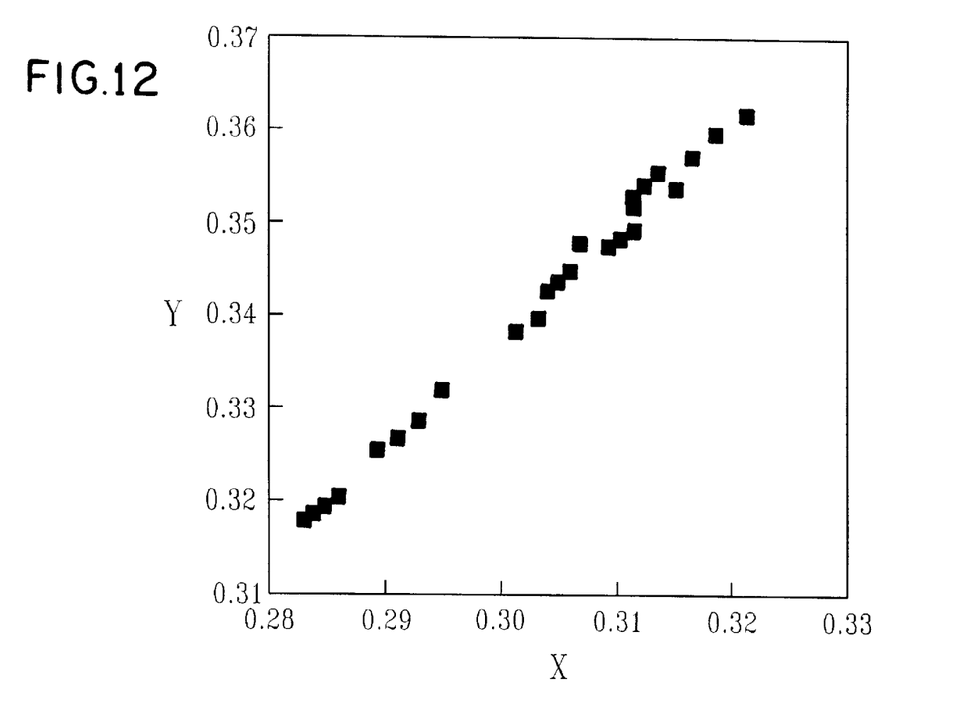
FIG. 12 shows coloring characteristics in the subject invention.

FIGS. 11 and 12 show evaluation results of the prototype in Table 4. FIG. 11 shows characteristics of upper and lower viewing angles and FIG. 12 shows changes of chromaticity. FIGS. 11 and 12 correspond to FIGS. 7 and 8 used to explain the background art. As shown in FIG. 11, reversal can almost completely be prevented. Moreover, as shown in FIG. 12, the viewing angle dependency of white chromaticity is very good because the range of fluctuation of X and Y indications is approx. 0.4 at a visual angle of 40°.

Table 5 shows various constants obtained by actually experimentally manufacturing embodiment 7 in Table 2.

TABLE 5

| | R | G | B |
|---|---|---|---|
| Wavelength (μm) | 0.61 | 0.55 | 0.41 |
| Δn | 0.1594 | 0.1660 | 0.1922 |
| d (μm) | 5.o | 5.0 | 4.0 |
| R (V$_1$) (μm) | 0.2533 | 0.2632 | 0.2418 |
| R (V$_1$)/λ | 0.42 | 0.48 | 0.56 |
| ΔR/λ | 0.32 | 0.37 | 0.50 |
| T (%) | 71 | 84 | 100 |

Figure 13:
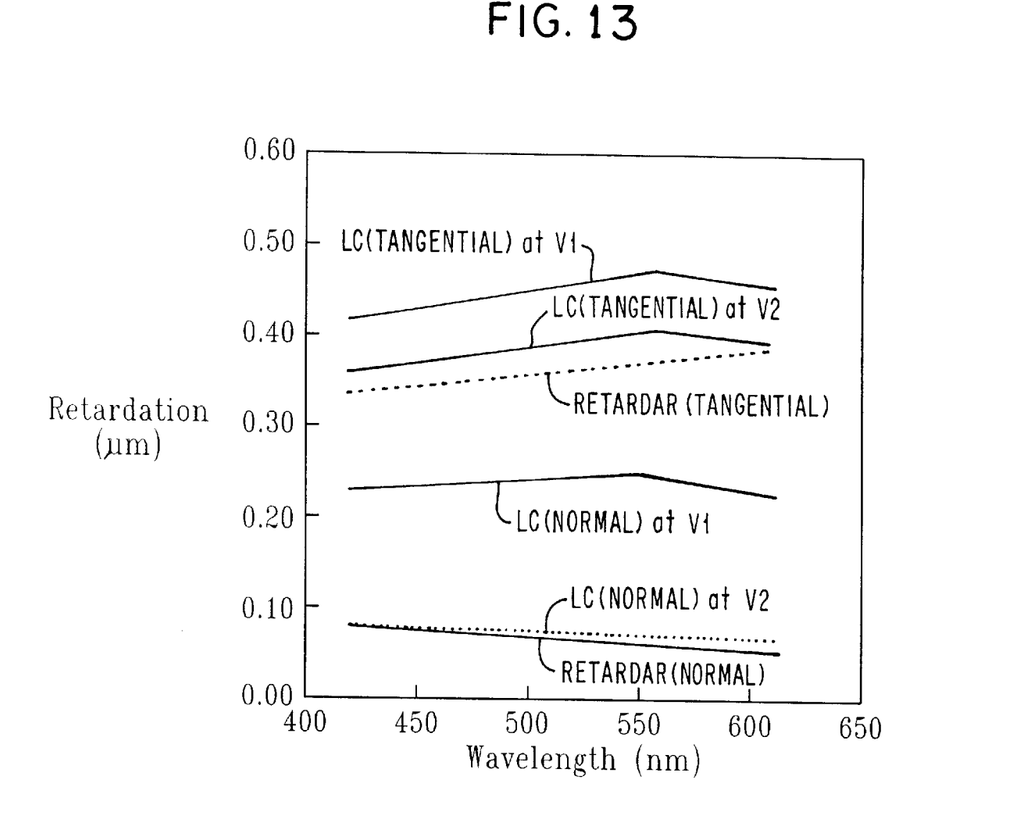
FIG. 13 shows retardation-wavelength characteristics in right and left viewing-angle directions in the subject invention.

FIG. 13 shows the dependency of right and left viewing angles of the prototype in Table 5. FIG. 13 corresponds to FIG. 9 of the background art. As shown in FIG. 13, a phase difference compensation film can be matched with the retardation of liquid crystal by keeping ΔR/λ in a certain range for every color. Thereby, it is possible to prevent coloring for right and left viewing angles. It is understood that this effect is a unique effect obtained by optimizing a gap interval.

The subject invention will be announced in IEICE (Institute of Electronics, Information and Communication Engineers) to be held on February, 1996. Refer to "Optical design of OCB display device" in SHINGAKUGIHO (transliterated)(H. Nakamura).

It is possible to prevent screen viewing characteristics such as reversal and coloring at upper and lower viewing angles from deteriorating in an OCB-mode liquid-crystal display. This is because the optimum value of R(V$_1$)/λ is obtained for B wavelength. Moreover, the subject invention makes it possible to keep transmittance in a certain range for each color while preventing viewing characteristics from deteriorating. Thereby, it is possible to prevent coloring at right and left angles of visibility. Therefore, it is possible to keep a wide viewing angle which is an advantage of OCB and at the same time, improve a high angle-of-visibility characteristic which is a disadvantage of OCB, and provide a low-power-consumption LCD.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A method for driving a color liquid crystal display for displaying a plurality of colors, the liquid crystal display comprising liquid crystal material sandwiched between electrodes, the thickness of the liquid crystal material comprising a cell gap, the liquid crystal display further comprising a light incident side and a light exiting side, the method comprising the steps of:

applying a voltage (V) between the electrodes;

applying light of wavelength (λ) to the light incident side;

measuring a phase difference (R) between the incident light and the exiting light; and adjusting the voltage and wavelength to satisfy the expression $0.4 \leq R(V)/\lambda \leq 0.85$.

2. The method of claim 1, further comprising the step of setting the adjusted voltage to be the lowest driving voltage (V$_1$).

3. The method of claim 1, further comprising the step of setting the adjusted wavelength to be the minimum wavelength (λ$_1$) among wavelengths of light of said colors.

4. The method of claim 3, wherein the minimum wavelength (λ$_1$) has a value between 400 nm and 500 nm.

5. The method of claim 1, further comprising the step of adjusting the cell gap for each of said colors wherein a transmittance difference of said colors is kept in a range of ±5%.

* * * * *